C. J. COLEMAN.
COLORED MOVING PICTURE.
APPLICATION FILED MAR. 23, 1912.
1,271,668.
Patented July 9, 1918.
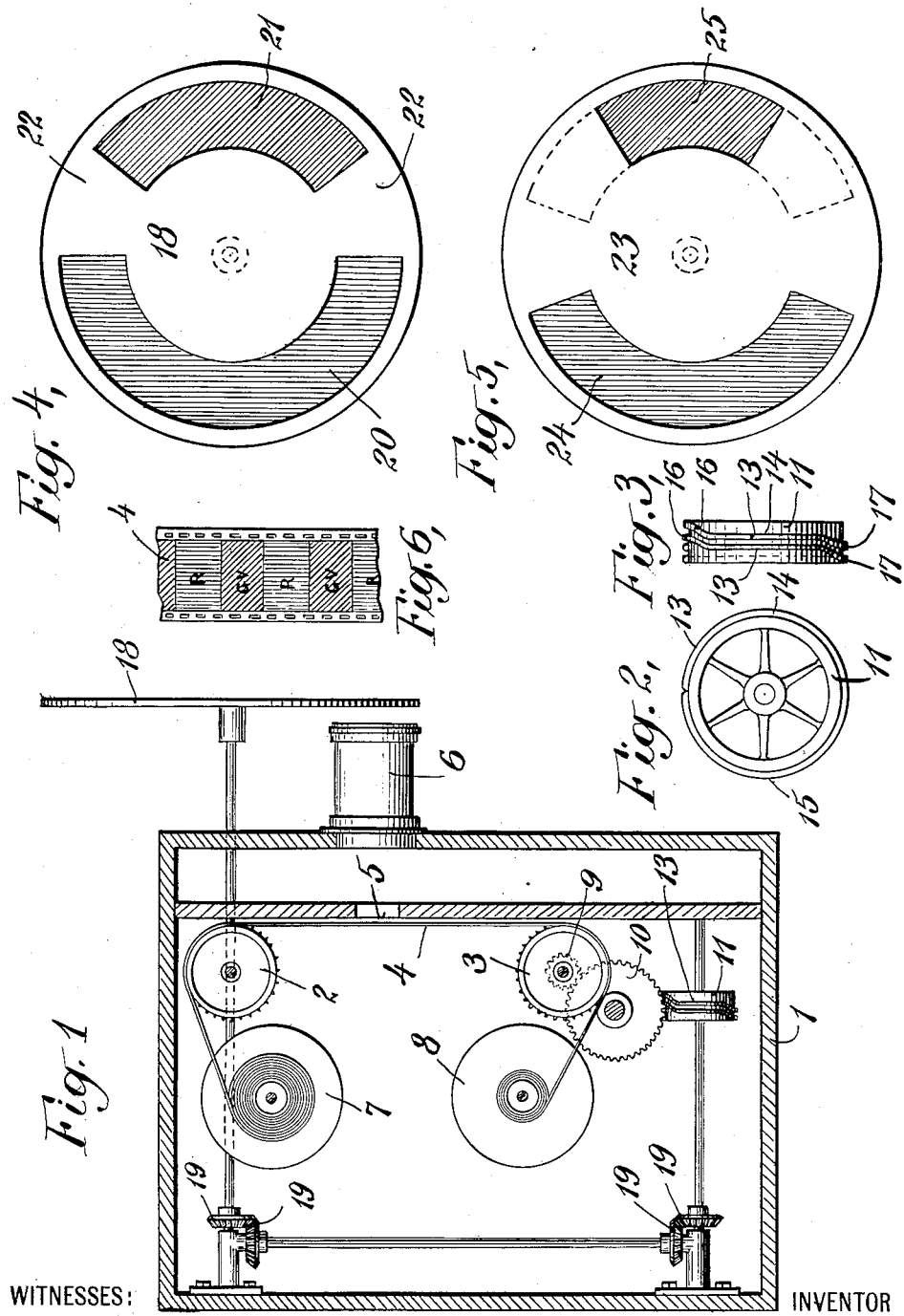

UNITED STATES PATENT OFFICE.

CLYDE J. COLEMAN, OF NEW YORK, N. Y.

COLORED MOVING PICTURE.

1,271,668.

Specification of Letters Patent.

Patented July 9, 1918.

Application filed March 23, 1912. Serial No. 685,689.

*To all whom it may concern:*

Be it known that I, CLYDE J. COLEMAN, a citizen of the United States, and a resident of the city of New York, county of New York and State of New York, have invented certain new and useful Improvements Relating to Colored Moving Pictures, of which the following is a specification.

My invention relates to improvements in the production of colored moving pictures. One object of my invention is to provide apparatus and a method by which the relative color values may be more accurately and efficiently proportioned to resemble the real object.

Further objects, features and advantages will more clearly appear from the detail description given below taken in connection with the accompanying drawing which forms a part of this specification. In the drawing—

Figure 1 is a sectional side view largely diagrammatical of an apparatus for carrying out my improvements in one form.

Fig. 2 is a side view of the special worm gear used in the apparatus shown in Fig. 1.

Fig. 3 is an edge view of the same.

Fig. 4 is a side view of the shutter shown in Fig. 1.

Fig. 5 is a side view of a modified form of shutter, and

Fig. 6 is a face view illustrating my improved film strip.

By a well known method of producing colored moving pictures one negative picture is produced on the film strip wholly by the red rays from the object by placing a red color screen in front of the film or camera lens. The next negative picture is produced on the strip wholly by the green-violet rays from the object by placing a green-violet color screen in front of the film during this exposure. These operations are repeated to produce a motion picture film, as described in United States Letters Patent No. 941,960. Or, if desired, three primary color screens may be used, as described in United States Letters Patent No. 645,477, the various screens being carried by a shutter rotated in synchronism with the moving picture film. The well known sensitive film, however, is less actinic to the red rays than to the rays of other colors, especially the violet rays, and therefore by the method above described the red colors are not brought out strongly enough or accurately, according to the real object, because the time of exposure given to the rays of each primary color is the same. If the film be made so active or the exposure be so long as to get the proper action of the red rays, the pictures will be over-exposed as to the rays of other colors, especially the violet. To overcome this defect I therefore allow the red rays to act on the negative film for a longer period of time than other rays (such as the green-violet) are allowed to act, in order that the color sensations may be more accurately adjusted. The defect may also be overcome to some extent in projecting the pictures through the positive film, by merely allowing the red colors to remain projected on the curtain for longer periods of time than the other rays.

Referring to the various figures, 1 represents a suitable frame carrying the sprockets 2 and 3, over which passes the film strip 4 by the opening 5 back of the lens 6. The film is unwound from reel 7 and wound up on reel 8, in any well known or suitable manner. The sprocket 3 carries a gear 9 which meshes with a gear 10 driven by a worm 11 on the shaft 12, which last may be driven in any suitable or well known manner. The worm 11 is provided with worm teeth 13 having two portions at 14 and 15 which maintain the gear 10 stationary while these portions engage the same, so that at these times the film 4 is maintained stationary. When, however, the curved portions 16 and 17 of the worm teeth engage the gear 10 the film is pulled downward the distance of one picture for each such engagement. There will therefore be two periods of rest for the film and two periods of movement thereof for each rotation of the worm 11. The portions 14 of the teeth 13 are only about half as long as the portions 15, so that as the worm 11 is driven at a constant speed each alternate picture will be exposed for a much less length of time than the next. The shutter 18 is rotated in synchronism with the worm 11 by gears 19, and is provided with a transparent red color screen 20 and a green-violet color screen 21 extending over a lesser arc. While the film is being held stationary by the portions 15 the red color screen 20 is passing before the lens, thus causing a long exposure by the red rays of the object, and when the film is being held stationary by the portions 14 the green-violet color screen 21 is passing in front of the lens, thus causing the next picture on the film to be made by a relatively short exposure to the green-violet rays from the object. When the portions 16 and 17 of the worm teeth are engaging the gear 10 to move the film, the blank portions pass in front of the lens to shut off the light.

In Fig. 6 is illustrated a section of the film 4 having a plurality of consecutive images or pictures of things in motion, different sensitized portions of which, which in the present case correspond with the different pictures, have been acted upon by light rays of red colors as at R, and other portions of which have been acted upon by other colors, as at GV, the portions acted upon by the red rays being so exposed for a longer period of time than the portions acted upon by other rays.

The same object may be accomplished to some extent with an apparatus in which each picture portion of the film remains at rest in front of the lens for the same length of time, but in which the time of exposure is varied by a change in construction of the shutter merely. Such a shutter is illustrated in Fig. 5 at 23. The shutter 23 is provided with a red screen at 24, and a green-violet screen at 25, and is rotated in synchronism with the moving film. Ordinarily the red and green-violet screens would be of the same extent or remain in front of the lens for the same length of time, that is, the green-violet screen would cover the portion of the shutter indicated by the dotted lines in Fig. 5. But in such case the red rays would be given no longer exposure than the green-violet. I therefore increase the relative time exposure of the red rays by decreasing the time of exposure of the green-violet rays by cutting down the size of the green-violet screen, as indicated in full lines in Fig. 5. This method, however, is at the expense of some loss in time and some increase in the time of non-exposure both in taking and projection, but it has the advantage of being easily applicable to present or future common forms of apparatus by only a slight change in the shutter.

Motion picture apparatus operating on somewhat the same principles as those described above, have been suggested by others but only in connection with systems wherein three or more sets of colors are used. Experience has shown, however, that they are all impractical on account of the excessive speed at which the film has to be run through the apparatus in order to make the colors blend on the screen, and I therefore limit my invention to a system employing two sets of colors.

Although I have described my improvements in great detail, I do not desire to be limited to such details except as clearly specified in the appended claims, since many changes and modifications will readily suggest themselves to those skilled in the art without departing from the spirit and scope of my invention in its broader aspects.

Having fully and clearly described my improvements, what I claim as new and desire to secure by Letters Patent, is:

1. The improved method of producing a moving picture film for colored moving pictures, which consists in alternately and rapidly exposing different sections of a photographically sensitive film strip to light rays of red colors and light rays of another color, allowing the rays of red colors to act on the film for a longer period of time than rays of another color by holding the film motionless for a longer period while exposed to the red rays than while exposed to rays of the other color.

2. The improved method of producing a moving picture film for colored moving pictures, which consists in rapidly exposing separate sections of the film to light rays of red colors and light rays of another color, allowing the film to be exposed to the light rays of red colors for a longer period of time than to rays of the other colors by holding the film motionless for a longer period while exposed to the red rays than while exposed to rays of the other color.

3. The improved method of producing colored moving pictures by means of a rapidly moving film strip, which consists in alternately screening out red rays of light and then rays of another color, allowing the red rays to act for a longer period of time than rays of the other color by holding the film motionless for a longer period while exposed to the red rays than while exposed to rays of the other color.

In testimony whereof, I have signed my name to this specification, in the presence of two subscribing witnesses.

CLYDE J. COLEMAN.

Witnesses:
GORHAM CROSBY,
EDWIN SEGER.